Nov. 18, 1958  H. JORDAN  2,860,836
MOUNTING SLEEVE AND CLAMP MEANS FOR DISPOSAL DEVICES
Filed May 16, 1955  2 Sheets-Sheet 1

Hans Jordan,
INVENTOR.
By His Attorneys.
Harris, Kiech, Foster & Harris.

Nov. 18, 1958    H. JORDAN    2,860,836
MOUNTING SLEEVE AND CLAMP MEANS FOR DISPOSAL DEVICES
Filed May 16, 1955    2 Sheets-Sheet 2

HANS JORDAN,
INVENTOR.
By His Attorneys.
HARRIS, KIECH, FOSTER & HARRIS.

United States Patent Office 2,860,836
Patented Nov. 18, 1958

2,860,836

MOUNTING SLEEVE AND CLAMP MEANS FOR DISPOSAL DEVICES

Hans Jordan, Los Angeles, Calif., assignor to Given Machinery Company, Los Angeles, Calif., a partnership Application May 16, 1955, Serial No. 508,495

11 Claims. (Cl. 241—100.5)

This invention relates to means for use at the drainage outlets of kitchen sinks for the suspension of garbage disposal devices which have become more or less conventional equipment.

More particularly the invention relates to novel constructions of drainage sleeves which are positioned in drainage openings of sinks as stated and carry at their lower ends attachment means for connecting disposal devices thereto and are also equipped internally to receive stopper devices controlling water flow from the sink.

A particular object of this invention is to provide a thin steel drainage sleeve which is easily shaped, as by stamping and spinning, to provide for easy attachment of means for mounting disposal devices thereon and for carrying the indicated stoppers.

It is also an object of the invention to provide sink drainage sleeves, particularly of thin non-corroding metal, more particularly stainless steel, that may be shaped easily, not only to receive readily means for mounting disposal devices thereon, but may also be readily shaped, as by stamping or spinning, to provide for a mounting of rubber stoppers and the like in both seating position to prevent water passage and in elevated position to permit appropriate water flow.

A further object is to provide a sink sleeve of the indicated nature enabling attachment of a disposal device through the medium of simple clamping means.

Other objects of the invention and various features of construction will become apparent upon reference to the following specification and the accompanying drawings wherein certain embodiments are illustrated.

Figure 1:
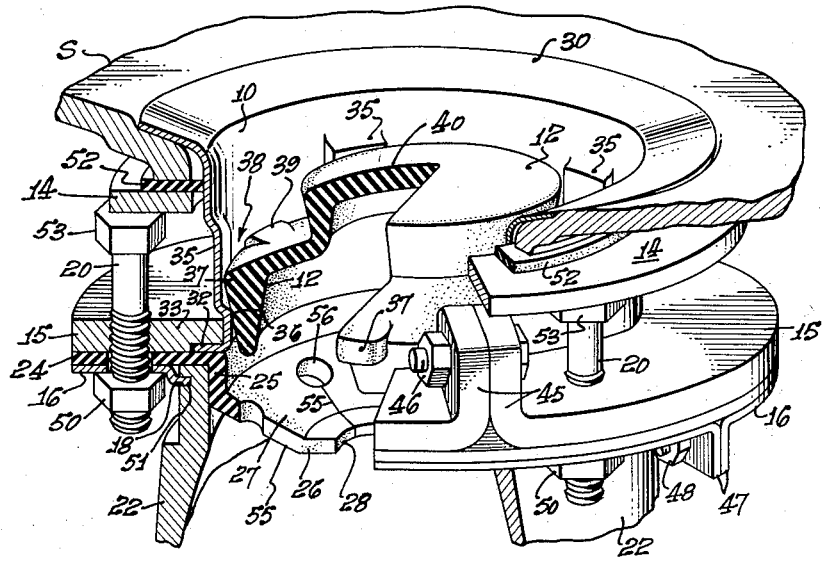
Fig. 1 is in general a perspective view showing in vertical section the left portion of an assembly in accordance with this invention and in vertical elevation the right portion of such assembly.
Figure 2:
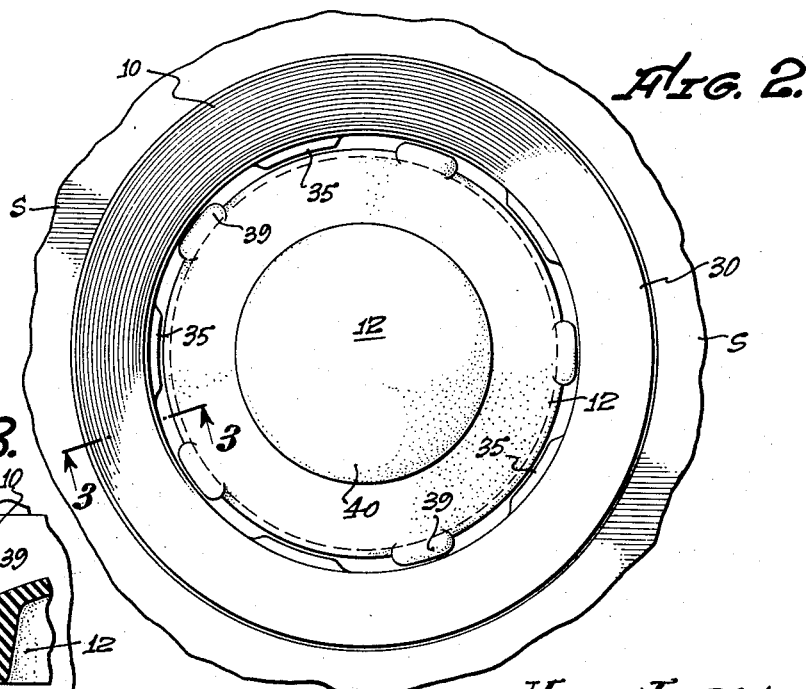
Fig. 2 is a top plan view of the structure indicated in Fig. 1.

In the drawings, Fig. 1 illustrates the features of this improvement in assembled relationship to support a disposal device, the principal parts being illustrated in the form of a thin stainless steel drainage sleeve 10 appropriately shaped as by spinning, stamping and otherwise as required, a rubber stopper 12, a bind ring 14 clamping the sleeve 10 to the sink S from which the assembly is suspended, a mounting ring 15, a carrying ring or clamp ring 16 having an inwardly offset integral supporting flange 18, and screw bolts 20 which clamp and bind the various rings 14, 15 and 16 in operative position. To avoid metal-to-metal contact and thereby prevent transmission of vibration from a supported disposal device such as a garbage grinder contained in a metallic housing 22, a rubber cushioning ring 24 is provided between the mounting ring 15 and the clamping ring 16, which cushioning ring integrally carries an inner down-turned rim 25 lying alongside the inner wall of the housing 22 and provides an inwardly directed splash guard or antisplash diaphragm 26 that is in the form of a plurality of flexible fingers 27 whose inner ends define a relatively small central water passing opening 28.

Figure 3:
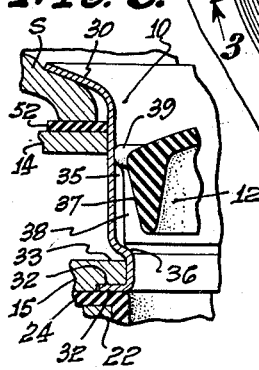
Fig. 3 is a sectional detail taken on the line 3—3 of Fig. 2, at a position slightly forward of the section of Fig. 1.

The drainage sleeve 10 is desirably formed from thin steel not over about 0.04 inch in thickness, which may, however, be as thin as about 0.025 inch thick, preferably about 0.037 inch thick, which is in sharp contrast to the common thickness of former sink drainage sleeves of about 0.093 or 0.1 inch. The sleeve 10 is provided with an integral, stamped, outwardly directed, sloping flange 30 which bears upon a corresponding seat around the drainage opening of the sink S. The lower end of the sleeve 10 is provided with a radially outwardly directed integral flange 32 which is overhung and engaged by a correspondingly shouldered inner annular flange 33 of the mounting ring 15. The sleeve 10 is also provided with a plurality of spaced inwardly struck positioning detents 35 which serve to center the stopper 12 when seated in the ring 10, the ring 10 being inwardly offset below the detents 35 and above its flange 32 to provide an annular seat 36 upon which the tapered outer wall 37 of the stopper 12 may rest to prevent water flow. However, when the stopper is elevated into a drainage position such as seen in Fig. 3, an annular water passage 38 is provided between the body of the stopper 12 and the main wall of the sleeve 10, the stopper 12 being retained in such elevated position by means of a plurality of integral rubber lugs 39 which correspond in number with the detents 35 and project far enough radially outward to engage upon the upper ends of the detents 35 to permit water flow when required. Rotation of the stopper 12 through a few degrees brings the lugs 39 into position to drop down between adjacent detents 35 to seat the stopper as seen in Fig. 1, reverse rotation, when the stopper is elevated, serving to bring the lugs 39 to the tops of the detents 35 for retaining the stopper. The stopper is conveniently manipulated or entirely removed through an integrally formed knob 40.

Figure 6:
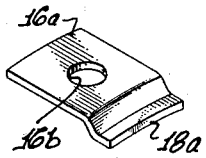
Fig. 6 is a detail of a usable clamp lug.

For the purpose of assembling, the sleeve flange 32 is just small enough to pass through the sink opening, being narrowed at opposite sides, if necessary, to pass the opening upon being tipped. The ring 15 has threaded holes to receive the bolts 20 and is conveniently a split or two-part ring whose end portions are formed with upstanding lugs 45 to receive bolts 46. The clamp ring 16 may be a split ring or sectional ring having down-turned lugs 47 which receive anchoring bolts 48. Unthreaded holes in the clamp ring 16 pass freely the lower portions of the bolts 20 which are provided on their lower ends with nuts 50 to be turned up to position to retain the rings 15 and 16 with the rubber cushioning ring 24 clamped between them. Thus, the inner flange 18 of the clamp ring 16, being received in an outwardly directed groove 51 in the upper end of the metallic housing 22, supports the latter and its contained grinding mechanism in operative position. In a less preferred structure, separate lugs 16a perforated at 16b as seen in Fig. 6 and having offset portions 18a to engage in the groove 51 might be used.

The previously mentioned bind ring 14 is held in clamping position against an appropriate packing ring 52 by turning the heads 53 of the bolts 20 up into binding position with an appropriate tool. Proper positioning of the rings 14 and 15 is effected by reason of the threaded holes in the mounting ring 15. By forming the cushioning member 24 integral with the antisplash diaphragm 26 through the connecting rim 25, a unitary rubber member for these purposes is easily provided. The fingers 27 of the diaphragm 26 are formed by appropriate slits 55 which extend inward from the water passage 28 to small holes 56 which insure against tearing.

Figure 4:
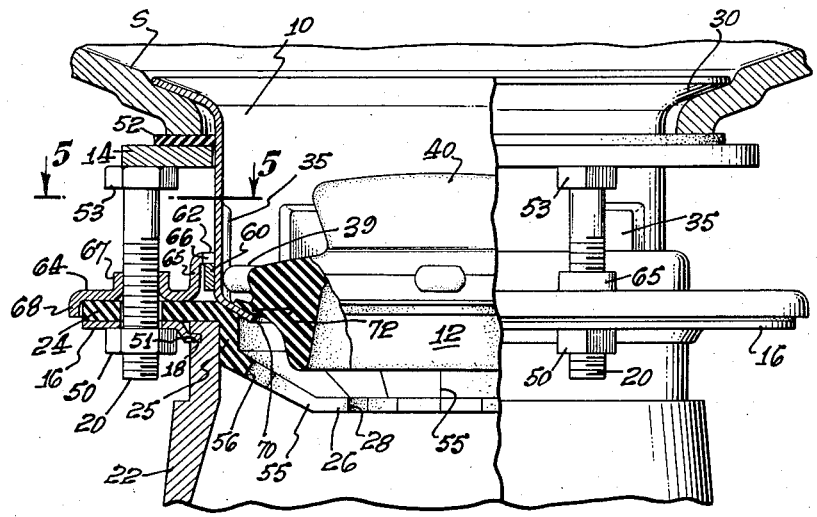
Fig. 4 is a fragmentary vertical section showing certain modifications.
Figure 5:
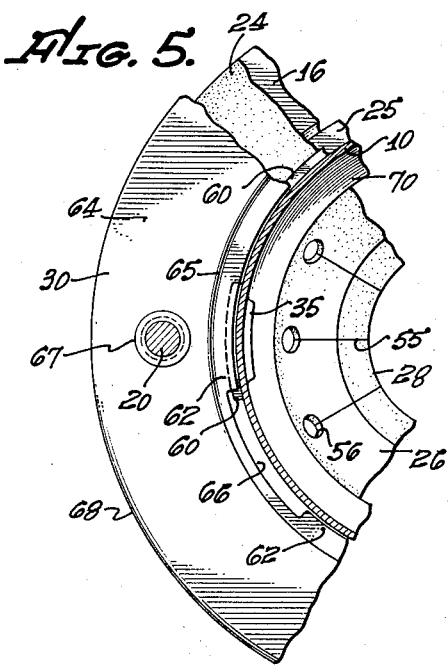
Fig. 5 is a fragmentary plan view of the mounting ring of Fig. 4.

In Fig. 4 there is illustrated a somewhat modified form of sleeve 10 and mounting means for the disposal housing 22. Here, instead of providing a sleeve flange 32 of the form of Fig. 1, the lower portion of the sleeve 10 is maintained in alignment with the upper portion of the sleeve, and to such lower portion a plurality of spaced steel strips 60 is spot-welded to the outer wall thereof in circular series. These strips 60 are adapted to be overhung by inner flange portions 62 of a stamped mounting ring 64 which replaces the mounting ring 15 and has an upstanding rim 65 which carries the flange portions 62 at its top. The flange portions 62 provide between them a plurality of notches 66 to pass over the strips 60, the mounting ring 64 being then rotated so that the flange portions 62 overhang the strips 60 in supporting relationship, the mounting ring 64 being then bound to the clamp ring 16 by the bolts 20 as in the other form. To provide for adequate threading of the bolts 20 in the ring 64, the ring 64 is provided with an upstanding boss 67 at each bolt hole, the boss being threaded throughout its length. This ring 64 is also provided with an outer annular down-turned stiffening flange 68.

Further, in the form of Fig. 4, the seat for the stopper 12 is modified, this being in the form of an inwardly directed sloping seating flange 70 at the lower end of the sleeve 10 to receive an outwardly offset yieldable seating lip 72 integral with the stopper 12. However, this stopper retains the same lugs 39 to hold it in elevated position on the inwardly struck detents 35 as in Fig. 1.

I claim as my invention:

1. In combination in means for suspending a disposal device from a sink: a thin walled metallic sleeve having an integral supporting flange at its upper end and having adjacent its lower end outwardly extending shoulder-providing means permanently fixed thereon and lying beyond the outer wall portion of such sleeve; mounting ring means disposed outside said sleeve and having flange means overlying and borne upon shoulder portions of said shoulder-providing means; carrying means underlying said mounting ring means and having inwardly extending flange portions for carrying external support means of a disposal device to be supported; and clamp means engaging said mounting ring means and said carrying means and binding the same upon said shoulder-providing means, said sleeve being a thin rustless steel sleeve having a thickness of between about 0.025 inch and 0.04 inch, and a lower portion of said sleeve being directed inward to form an annular stopper seat.

2. A combination as in claim 1 wherein cushioning means is clamped between said mounting ring means and carrying means.

3. A combination as in claim 1 wherein said flanged mounting ring means is in the form of plural ring sections bolted together in position bearing on said shoulder-providing means.

4. A combination as in claim 3 wherein said clamp means are threaded bolts and said ring sections have threaded holes threadedly receiving said bolts, and nuts are provided on the under ends of said bolts to clamp the carrying means to said sections.

5. A combination as in claim 4 wherein said carrying means is split ring means.

6. A combination as in claim 5 wherein said split ring means has adjacent ends bolted together.

7. A combination as in claim 1 wherein said sleeve is a shaped thin stainless steel sleeve having a thickness of about 0.037 inch and said shoulder-providing means is an out-turned integral flange at the lower end portion of said sleeve.

8. In suspension means for suspending a disposal device from a sink: a thin walled metallic sleeve having an integral supporting flange at its upper end and having adjacent its lower end outwardly faced flange means; mounting ring means encircling the lower portion of said sleeve and adapted to seat on said flange means; carrying means below said mounting ring means and having inwardly extending flange portions for carrying external support means of a disposal device to be supported; cushioning means disposed between said mounting ring means and said carrying means; an annular cushioning ring encircling the upper portion of said sleeve and adapted to engage the sink; a bind ring encircling said sleeve below said cushioning ring and above said mounting ring means; and clamping means engaging said mounting ring means and said carrying means to draw the same together to compress said cushioning means therebetween and engageable with said bind ring to move the same upwardly to compress said cushioning ring against the sink.

9. A thin-walled drainage sleeve for a sink and adapted to support a waste disposal device therefrom, in the form of a thin rustless steel sleeve having a thickness between about 0.025 inch and 0.04 inch, said sleeve having at its top an integral outwardly directed upper flange to rest upon a sink around a drainage opening therein, said sleeve also having an integral inturned inner annular seat adjacent its lower end and also adjacent its lower end an integral outer annular seat adapted to support an underlying disposal device, the upper portion of said sleeve directly adjacent to said upper flange being a plain vertical circular surface and there being provided below said surface and above said seats inwardly extending circumferentially spaced vertical ribs.

10. A thin-walled drainage sleeve for a sink and adapted to support a waste disposal device therefrom, in the form of a thin rustless steel sleeve having a thickness between about 0.025 inch and 0.04 inch, said sleeve having at its top an integral outwardly directed upper flange to rest upon a sink around a drainage opening therein, said sleeve also having an integral inturned inner annular seat adjacent its lower end and also adjacent its lower end an integral outer annular seat adapted to support an underlying disposal device, said sleeve being provided with integral, vertical, circumferentially spaced ribs above said seats.

11. A thin-walled drainage sleeve for a sink in the form of a thin rustless steel sleeve having a thickness between about 0.025 inch and 0.04 inch, said sleeve having at its top an integral outwardly directed flange to rest upon a sink around a drainage opening therein, said sleeve also having an integral inturned annular seat adjacent its lower end to support a stopper in sealing relation and further having adjacent its lower end permanently fixed outwardly directed shoulder-providing means extending beyond the sleeve wall to support an underlying disposal device, said sleeve being provided at spaced intermediate locations with inwardly struck integral detents for resting thereon of spaced cooperating stopper means to hold a stopper in mounted position.

References Cited in the file of this patent

UNITED STATES PATENTS

| | | |
|---|---|---|
| 712,022 | Underhill | Oct. 28, 1902 |
| 1,851,574 | Fiederlein | Mar. 29, 1932 |
| 1,939,936 | Walker et al. | Dec. 19, 1933 |
| 1,994,527 | Merrill | Mar. 19, 1935 |
| 1,998,740 | Schubenel | Apr. 23, 1935 |
| 2,225,693 | Frances | Dec. 24, 1940 |
| 2,442,812 | Jordan | June 8, 1948 |
| 2,477,686 | Coss | Aug. 2, 1949 |
| 2,544,498 | Hiertz | Mar. 6, 1951 |
| 2,695,446 | Meyer | Nov. 30, 1954 |
| 2,709,046 | Hyde | May 24, 1955 |

FOREIGN PATENTS

| | | |
|---|---|---|
| 497,788 | Canada | Nov. 17, 1953 |